US008844375B2

(12) United States Patent
Sihler et al.

(10) Patent No.: US 8,844,375 B2
(45) Date of Patent: Sep. 30, 2014

(54) MECHANICAL FORCE COMPONENTS SENSING SYSTEM AND AN ASSOCIATED METHOD THEREOF FOR A MAGNETICALLY ENCODED DEVICE

(71) Applicant: General Electric Company, Schenectady, NY (US)

(72) Inventors: Christoph Martin Sihler, Hallbergmoos (DE); Marko Klaus Baller, Saarbrücken (DE); Kunal Ravindra Goray, Munich (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/720,097

(22) Filed: Dec. 19, 2012

(65) Prior Publication Data

US 2014/0165741 A1    Jun. 19, 2014

(51) Int. Cl.
*G01D 7/00*    (2006.01)
*G01L 5/16*    (2006.01)

(52) U.S. Cl.
CPC .................................... *G01L 5/164* (2013.01)
USPC .................................................... 73/862.041

(58) Field of Classification Search
USPC .................................................... 73/862.041
See application file for complete search history.

(56) References Cited

U.S. PATENT DOCUMENTS

| 4,627,298 | A | 12/1986 | Sahashi et al. |
| 5,062,062 | A | 10/1991 | Nishibe et al. |
| 5,591,925 | A | 1/1997 | Garshelis |
| 5,634,390 | A * | 6/1997 | Takeuchi et al. ................... 92/33 |
| 6,260,423 | B1 | 7/2001 | Garshelis |
| 6,490,934 | B2 | 12/2002 | Garshelis |
| 8,020,455 | B2 * | 9/2011 | Sihler et al. ............. 73/862.333 |
| 8,170,811 | B2 | 5/2012 | Grab et al. |
| 2006/0144166 | A1 | 7/2006 | Ruehl et al. |
| 2008/0282811 | A1 | 11/2008 | Hill |
| 2011/0023627 | A1 | 2/2011 | Herrmann et al. |

OTHER PUBLICATIONS

Turner et al., "Development of a Rotating-Shaft Torque Sensor for Automotive Applications",Control Theory and Applications, IEE Proceedings D , Issue Date : Sep. 1988, vol. 135, Issue: 5, pp. 334-338.

* cited by examiner

*Primary Examiner* — Max Noori
*Assistant Examiner* — Octavia D. Hollington
(74) *Attorney, Agent, or Firm* — Jason K. Klindtworth

(57) ABSTRACT

A system includes a device and a contactless inductive force sensing system. The device includes a first band having a first magnetically encoded region with a first magnetic polarity spaced apart from a second magnetically encoded region having a second magnetic polarity. The device further includes a second band having a third magnetically encoded region with the second magnetic polarity spaced apart from a fourth magnetically encoded region having the first magnetic polarity. The contactless inductive force sensing system is used for measuring one or more mechanical force components of the device and generating a mechanical force component signal.

20 Claims, 4 Drawing Sheets

MECHANICAL FORCE COMPONENTS SENSING SYSTEM AND AN ASSOCIATED METHOD THEREOF FOR A MAGNETICALLY ENCODED DEVICE

BACKGROUND

Rotary drive mechanisms are used as prime movers for various applications including automobile engines, electric motors of electric cars and industrial motors, and the like. For various kinds of the rotating drive mechanisms, there is a demand for simple and accurate measurement of a physical quantity such as a transmitted torque because such measurement is useful for analyzing drive mechanisms and obtaining a better understanding of the operating condition. Measurement of torque is particularly useful in the case of automobile engines, for example, because by measuring the torque at the engine, the transmission, propeller shaft, differential gear and other points of the drive system, it is possible to control the ignition timing for the engine, the amount of fuel injection, the timing for transmission shift, the gear ratio, and the like. In the case of industrial motors, for example, accurate torque measurement may provide data for optimizing control and diagnosis of rotary drive systems, thereby improving energy efficiency and driving characteristics.

Various kinds of torque detecting apparatus have conventionally been proposed, one of them being an apparatus for noncontactingly measuring the torque transmitted through a rotary magnetic material. However, conventional contactless sensors have lower sensitivity and the sensitivity is substantially dependent on the material properties of the shaft. In other words, use of direct magnetostrictive effect for measuring torque of large shafts requires complex sensor arrangements, difficult sensor calibration procedures and typically results in measurements with limited accuracy.

BRIEF DESCRIPTION

In accordance with one exemplary embodiment, a system having a device and a contactless inductive force sensing system are disclosed. The device includes a first band having a first magnetically encoded region with a first magnetic polarity spaced apart from a second magnetically encoded region having a second magnetic polarity. The device further includes a second band having a third magnetically encoded region with the second magnetic polarity spaced apart from a fourth magnetically encoded region having the first magnetic polarity. The first band is spaced apart from the second band such that the first magnetically encoded region is opposite the third magnetically encoded region and the second magnetically encoded region is opposite to the fourth magnetically encoded region. The first magnetically encoded region is separated from the third magnetically encoded region by a first torque-sensitive region and the second magnetically encoded region is separated from the fourth magnetically encoded region by a second torque-sensitive region. The contactless inductive force sensing system is used for measuring one or more mechanical force components of the device and generating a mechanical force component signal.

In accordance with another exemplary embodiment, a method includes measuring one or more mechanical force components of an exemplary device and generating a mechanical force component signal via a contactless inductive force sensing system.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

In accordance with the embodiments of the present invention, a system having a magnetically encoded device and a contactless inductive force sensing system are disclosed. The device includes a first band having a first magnetically encoded region spaced apart from a second magnetically encoded region via a first torque-sensitive region. The first magnetically encoded region has a first magnetic polarity and the second magnetically encoded region has a second magnetic polarity. The device further includes a second band having a third magnetically encoded region spaced apart from a fourth magnetically encoded region via a second torque-sensitive region. The third magnetically encoded region has the second magnetic polarity and the fourth magnetically encoded region has the first magnetic polarity. The first band is spaced apart from the second band such that the first magnetically encoded region is opposite the third magnetically encoded region and the second magnetically encoded region is opposite to the fourth magnetically encoded region. The contactless inductive force sensing system is used for measuring one or more mechanical force components of the device and generating a mechanical force signal. In some embodiments, the device may be a rotatable device including but not limited to rotatable shafts. In certain other embodiments, the device may be a non-rotatable device including but not limited to plates, bars, rods, shafts, or the like. The one or more mechanical force components include one or more of shaft torque, bending moments, and stresses. In accordance with certain other embodiments, an associated force sensing method is disclosed.

Figure 1:
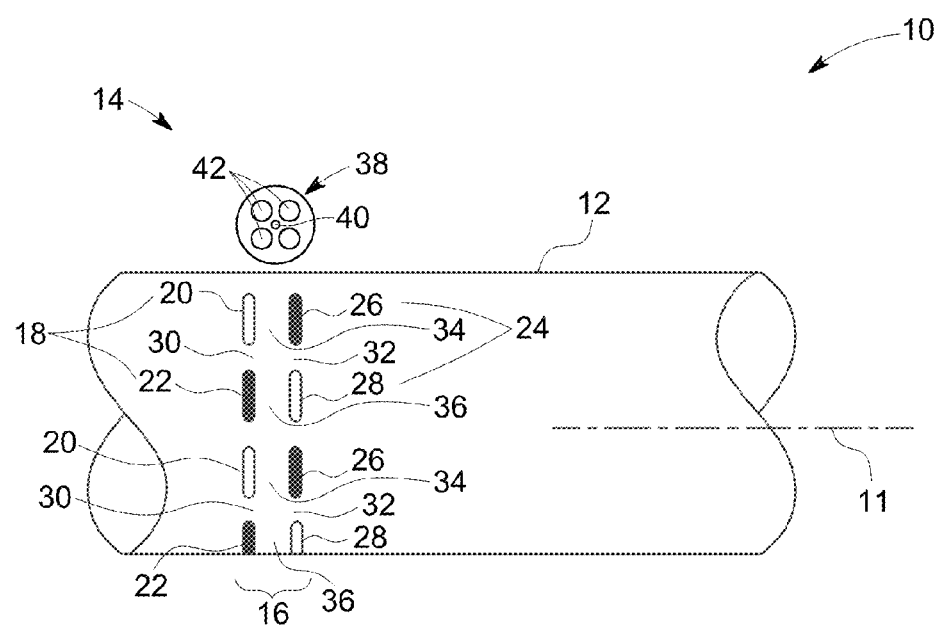
FIG. 1 is a diagrammatical representation of a system having a magnetically encoded shaft and a contactless inductive force sensing system in accordance with an exemplary embodiment.

Referring to FIG. 1, a system 10 having a magnetically encoded device 12 and a contactless inductive force sensing system 14 are disclosed. It should be noted herein that the terms "device" and "shaft" may be used interchangeably. The shaft 12 may for example, be coupled with one or more other rotatable drive shafts to form a drive train to transmit torque along a string of prime movers and loads such as turbine generators, electrical motors or compressors for example. Specifically, a magnetically encoded region 16 disposed around a circumference of the shaft 12 is disclosed. The encoded region 16 includes a first band 18 having a first magnetically encoded region 20 and a second magnetically encoded region 22. The first magnetically encoded region 20 is separated from a second magnetically encoded region 22 by a first dead zone 30. The encoded region 16 further includes a second band 24 having a third magnetically encoded region 26 and a fourth magnetically encoded region 28. The third magnetically encoded region 26 is separated from the fourth magnetically encoded region 28 by a second dead zone 32. The first magnetically encoded region 20 is separated from the third magnetically encoded region 26 by a first torque sensitive region 34 and the second magnetically encoded region 22 is separated from the fourth magnetically encoded region 28 by a second torque sensitive region 36. The first and second torque sensitive regions 34, 36 define regions that are sensitive to other forces having one or more force vector components that pass through the regions 34, 36. Moreover, the first magnetically encoded region 20 is disposed opposite the third magnetically encoded region 26 and the second magnetically encoded region 22 is disposed opposite the fourth magnetically encoded region 28.

In the illustrated embodiment, the first magnetically encoded region 20 has a first magnetic polarity and the second magnetically encoded region 22 has a second magnetic polarity. The third magnetically encoded region 26 has the second polarity and the fourth magnetically encoded region 28 has the first magnetic polarity. A typical material of the shaft 12 includes a standard steel alloy, such as 34CrNiMo8, for example. Other shaft materials suitable for use include 1.2721 50NiCr13, 1.4313×4CrNi13-4, 1.4542×5CrNiCuNb16-4, and 30CrNiMo8. Appropriate spaced and oriented electrode arrays may be used to encode magnetically polarized regions of any desired shape, spacing in accordance with the embodiments of the present invention. The spacing between the encoded regions and location of encoding may vary depending on the application. All such permutations and combinations of encodings discussed herein are also envisioned.

In another embodiment, the first band 18 having the first magnetically encoded region 20 and the second magnetically encoded region 22, and the second band 24 having the third magnetically encoded region 26 and the fourth magnetically encoded region 28 are disposed oriented along an axial direction of the shaft 12. In yet another embodiment, the encoded regions 20, 22, 26, and 28 may be disposed oriented inclined relative to an axis 11 of rotation of the shaft 12. Specifically, the encoded regions 20, 22, 26, 28 may be formed in a spiral pattern relative to the axis of rotation of the shaft 12. When a mechanical torque is applied to the torque sensitive regions between the encoded regions, the magnetic permeability of the torque sensitive region changes, and the magnetic field (flux) is altered and the altered magnetic field is detected by the inductive torque sensing system 14. In certain other embodiments, the span of the encoded regions 20, 22, 26, 28 along the circumference of the shaft 12 may be varied depending on the application. For example, the span of each encoded region may span around one-half of the circumference of the shaft 12.

A location of maximum tangential (or axial) positive magnetic field strength is designated by the first and fourth magnetic encoded regions 20, 28. A location of maximum tangential (or axial) negative magnetic field strength is depicted by the second and third magnetic encoded regions 22, 26. In certain embodiments, the regions of maximum positive magnetic field strength may be exchanged with the regions of maximum negative field strength without departing from the scope of the present invention. The terms positive and negative magnetic field strength reflect the direction of the magnetic field lines, for example, the positive magnetic field strength refers to field lines pointing to the right along the shaft 12 and the negative magnetic field strength refers to field lines pointing to the left along the shaft 12.

The magnetostrictive effect can be advantageously utilized with enhanced accuracy by combining the magnetostrictive effect with magnetically encoded regions applied to the shaft. The shaft material or the material regions are encoded by passing current through the shaft 12. The encoding is permanent when applied to a suitable material and when created by a current with a sufficiently high current density. Encoding electrodes are electrically coupled to the shaft 12 to enable current flow from one or more input electrodes through regions of the shaft 12 to one or more output electrodes. The current induces a magnetic field that creates magnetically polarized encoded regions within the shaft 12. When the encoding current and the resultant encoding magnetic field are applied to a ferromagnetic material, the boundaries between magnetic domains shift and the domains rotate resulting in change in dimensions of the material along the magnetic axis. Preferably the encoding electrodes are disposed to create a plurality of uniform magnetic regions 20, 22, 26, 28 on the shaft 12. Conversely, one or more magnetic parameters of the material change when subjected to a mechanical force or a bending/twisting/torque moment. Specifically, such forces change the material properties and in turn cause a change in an external component of the magnetic field detectable by the inductive force sensing system 36.

In the illustrated embodiment, a contactless inductive force sensing system 14 is used for measuring one or more mechanical force components of the shaft 12. In the illustrated embodiment, the system 14 includes an inductive force sensor 38 disposed proximate to the magnetically encoded region 16 of the shaft 12. The illustrated inductive force sensor 38 includes a primary or excitation coil 40 through which an electric current is passed to generate a magnetic field that permeates into the shaft 12. The sensor 38 further includes measurement or pick-up coils 42 for receiving the magnetic field transmitted back from the shaft 12. In this example, four pick-up coils 42 equiangularly spaced ninety degrees apart around the excitation coil 40. The sensor 38 measures one or more force components, for example a torque based on anisotropic magnetostrictive effect in ferromagnetic materials of the shaft. It should be noted herein that the permeability for the magnetization of the shaft 12 in the direction of compressive stress is different in comparison with the direction of tensile stress. The inductive sensor 38 is used to measure such a difference in permeability of magnetization of the shaft 12. An output of each pick-up coil 42 is an electrical signal that depends on the total magnetic reluctance. Part of the total magnetic reluctance is established due to the air gap between the coils 40, 42 and the shaft 12 and remaining part of the total magnetic reluctance is established by the shaft 12 itself. The magnetic reluctance of the shaft 12 varies as a function of the force component, for example, a torque on the shaft 12.

It should be noted herein that specifically, in accordance with the embodiments of the present invention, the inductive sensor 38 do not detect changes in the permanent magnetic field of the magnetically encoded region 16 of the shaft 12, but rather detects changes in the permeability of the encoded region 16 probed by the induced magnetic fields of the inductive force sensor 38.

As discussed herein, the inductive force sensor 38 is disposed proximate to the encoded regions 20, 22, 26, 28 of the shaft 12. In the illustrated embodiment, the sensor 38 is disposed in a spaced-apart relation from a circumference of the shaft 12 and is sensitive to axial components of the magnetic field in the torque-sensitive regions 34, 36. In the illustrated embodiment, a force vector along a first axial direction extending from the third magnetically encoded region 26 to the first magnetically encoded region 20 increases the magnetic field within the first torque-sensitive region 34. Further, a force vector along a second axial direction opposite to the first axial direction decreases the magnetic field strength within the second torque-sensitive region 36. The first and second torque-sensitive regions 34, 36 are maximally sensitive to a plurality of force components perpendicular to the first and second bands 18, 24 and minimally sensitive to a plurality of force components parallel to the first and second bands 18, 24.

The accuracy of sensing system is enhanced by employing the magnetically encoded regions created in the shaft 12 or on a magnetically encoded material applied to the shaft 12. Such a magnetic encoding converts the shaft 12 into a component of the sensing system and produces a strong magnetic circuit within the shaft 12, and magnetic field components external to the shaft 12. Such an exemplary magnetic encoding leads to an increase in sensitivity of the inductive force sensor 38 that is operated based on magnetostriction effect since the coils of the sensor 38 are arranged in such a way that the flux components caused by magnetostriction (orthogonal to the excitation flux) have to cross the boundary between the two magnetically polarized encoded regions.

Although a shaft is discussed herein, the device 12 is equally applicable to plates, bars, rods or the like. In some embodiments, the device 12 is a rotatable device and in certain other embodiments, the device 12 is a non-rotatable device.

Figure 2:
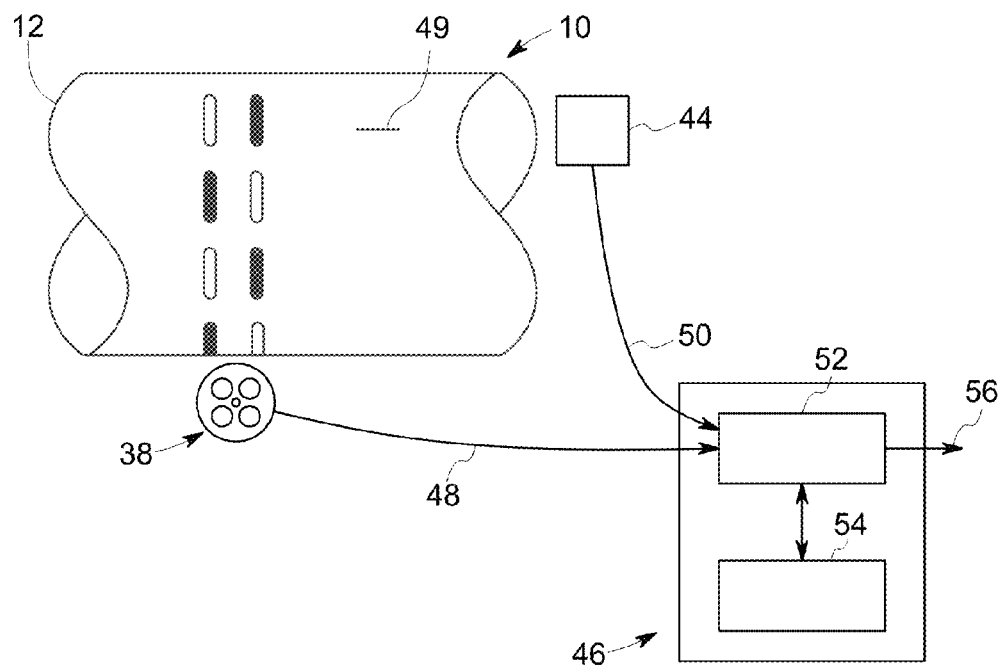
FIG. 2 is diagrammatical representation a system having a magnetically encoded shaft and a contactless inductive force sensing system in accordance with an exemplary embodiment.

Referring to FIG. 2, a system 10 having the magnetically encoded shaft 12 and a contactless inductive force sensing system 14 are disclosed. In the illustrated embodiment, the system 14 additionally includes a position sensor 44 and a controller 46. The inductive force sensor 38 is disposed proximate to the magnetically encoded region 16 of the shaft 12 and coupled to a controller 46 via a connector 48. The sensor 38 provides a signal indicative of the measured force component of the rotating shaft 12 to the controller 46. The position sensor 44 is coupled to the controller 46 via a connector 50. The position sensor 44 provides a signal indicative of the rotational position of the shaft 12 for corresponding positions on the circumference of the shaft 12. In one embodiment, the position sensor 44 may be configured to detect the passage of one or more magnetic markers 49 at predetermined circumferential locations around the shaft 12 as the shaft is rotated in order for the rotational position of the shaft 12 to be determined. Alternatively, the position sensor 44 may be a part of an existing component associated with or connected to the shaft 12 or to a drive train of which the shaft 12 forms a part, such as a stator of a machine connected to the drive train or an encoder connected to the drive train. The controller 46 correlates the signal indicative of the force component, for example torque, with data indicative of material properties at corresponding circumferential positions of the shaft 12. The controller 46 includes a Central Processing Unit (CPU) 52 for performing processing operations associated with the force component signal and the position signal. The data indicative of material properties at corresponding circumferential positions of the shaft 12 may be stored in a memory such as a look up table 54 which may also be provided in the controller 46. Alternatively, a "pattern recognition scheme" based on the known data in the memory 54 can be used to detect shaft position. The controller 46 is configured to generate a modified force component signal 56 in which the effects of shaft defect are eliminated or at least reduced by removing the component of the signal caused by the inherent inhomogeneous properties of the shaft 12.

A damping controller (which may be a part of the controller 46) may receive the generated modified force signal 56 for detecting a presence of torsional vibration on the drive train corresponding to a natural frequency of the shaft 12 of the drive train and may then generate a damping control signal for damping torsional vibrations of the drive train.

In accordance with the embodiments discussed herein, the magnetic polarization of the shaft 12 increases the sensitivity of the magnetostrictive sensing of the inductive sensor 38 and minimizes disturbances in the measurement caused by intrinsic material properties of the drive shaft 12. The absolute sensitivity such a sensing system can be controlled by adjusting the generated excitation flux. An output signal of such an exemplary sensing method facilitates to generate an output signal that is independent from shaft material properties.

Figure 3:
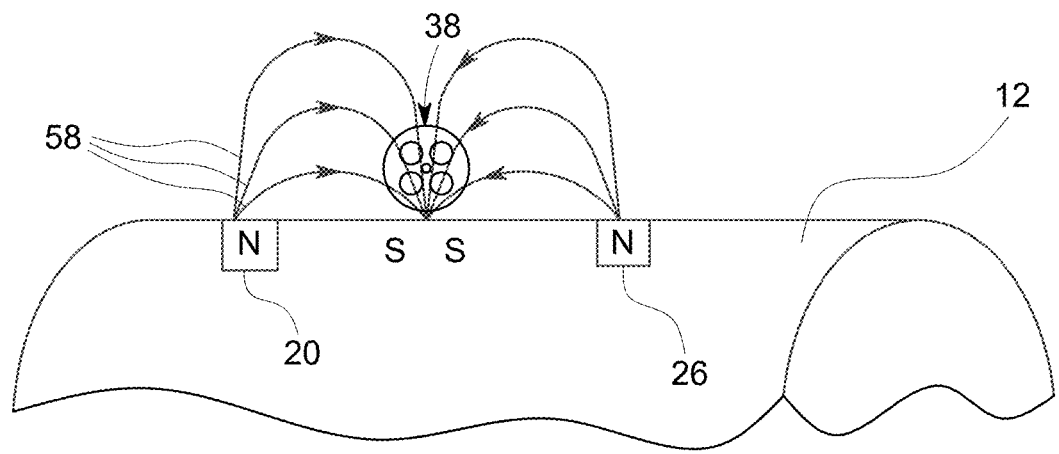
FIG. 3 is an axial cross-sectional view of the shaft with a portion of the first magnetically encoded region and the third magnetically encoded region formed therein, along with an inductive force sensor in accordance with an exemplary embodiment.

Referring to FIG. 3, an axial cross-sectional view of the shaft 12, a portion of the first magnetically encoded region 20 and the third magnetically encoded region 26 formed therein, and the inductive sensor 38 are disclosed. The illustrated view is defined by a plane passing through the regions 20, 26 and an axis of the shaft 12. In the illustrated embodiment, magnetic field lines 58 surrounding each of the regions 20, 26 are also depicted. A reference to the magnetic poles (north (N) and south (S)) for the magnetic field lines 58 are also represented. In another embodiment, the regions 20, 26 may appear circumferentially displaced from the illustrated plane of view and hence the field directional arrow directions may be reversed.

It should be noted herein that a weakening of the circular polarized magnetization of the shaft, caused by the high frequency flux components of the coils of the inductive sensor, can be excluded if the excitation flux density is limited to reasonable threshold values. In accordance with the embodiments discussed herein, the energy associated with the magnetic flux from the coils of the inductive force sensor is not sufficient to change an existing magnetization pattern of the shaft.

Figure 4:
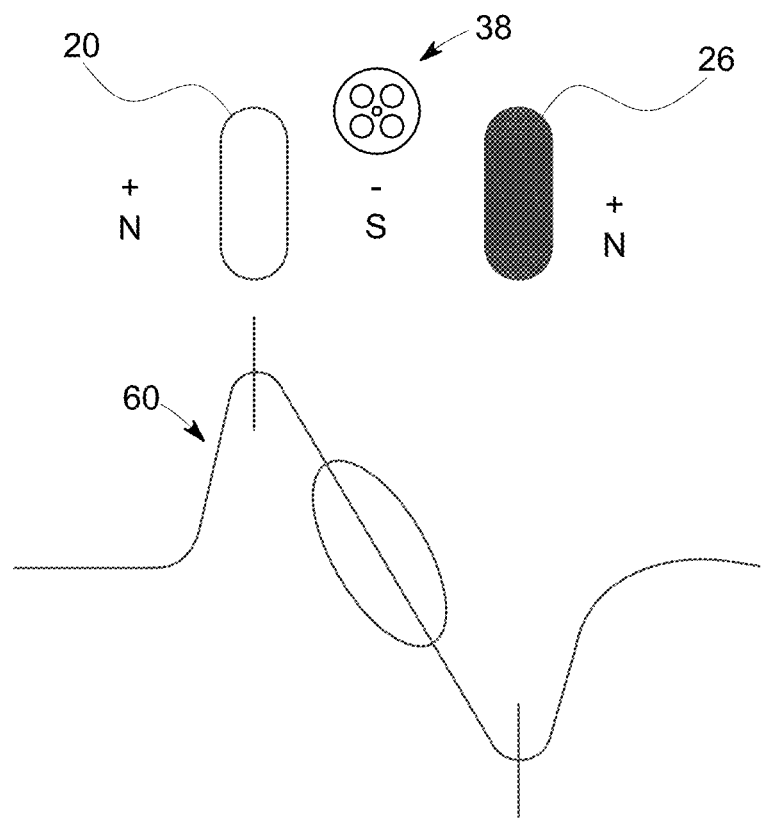
FIG. 4 illustrates two magnetically polarized encoded regions along with a proximately disposed inductive force sensor, and a waveform representing the magnetic field flux density associated with each of the regions in accordance with an exemplary embodiment.

FIG. 4 illustrates two magnetically polarized encoded regions 20 and 26 with the proximately disposed inductive sensor 38, for example, and a waveform 60 representing the magnetic field flux density associated with each of the regions 20, 26. The flux density is at the zero level approaching the region 20 from the left, and increases until the lux density a positive maximum limit in the middle of the region 20. The flux density then declines exiting the region 20, until the flux density reaches a negative maximum limit in the middle of the region 26. The flux density increases upon exiting the region 26 to the right and then returns to the zero level as the flux density reduces with increasing distance from the region 26. A positive sign to the left of the region 20 and to the right of the region 26 indicates that the flux density is higher in those corresponding regions. The negative sign between the two regions 20, 26 indicates that the flux density is lower in those corresponding regions. Hence the regions 20, 26 for example, indicate regions of maximum magnetic field flux densities.

Figure 5:
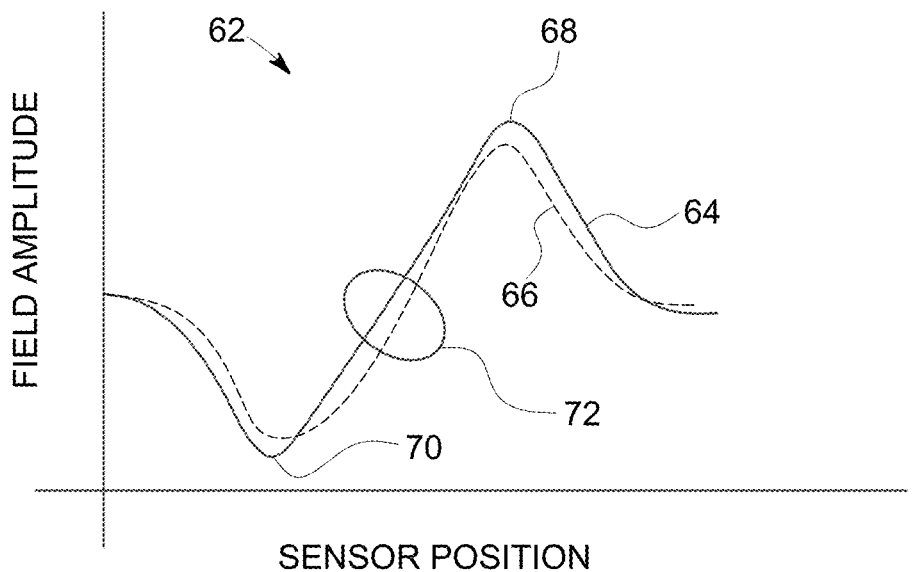
FIG. 5 illustrates a graphical representation of magnetic field amplitude (Y-axis) versus sensor position (X-axis) in accordance with an exemplary embodiment.

FIG. 5 illustrates a graphical representation of magnetic field amplitude (Y-axis) versus sensor position (X-axis). The graph shows a waveform or signal trace 62 representing a component of an externally measured magnetic field, for example, such as a magnetic field component of the magnetically encoded region 16 of FIG. 1. The waveform 62 includes a curve 64 that represents amplitude of the magnetic field through the sensed regions of the shaft 12. A curve 66 represents the magnetic field across the encoded region 16. The curve 64 includes a positive peak 68 that is representative of a region on the shaft 12 having the highest magnetic field strength along a first axial direction, and a negative peak 70 representative of a region on the shaft 12 having a highest magnetic field strength along a second axial direction opposite to the first axial direction. It should be noted herein that the curve 66 has difference 72 relative to the curve 68 in the torque-sensitive regions 34, 36 of the shaft 12. The difference 72 between the two curves 64, 66 is representative of the altered magnetic field due to the presence of an axial force component, such as the axial force component of a torque, in the torque sensitive regions 34, 36.

Figure 6:
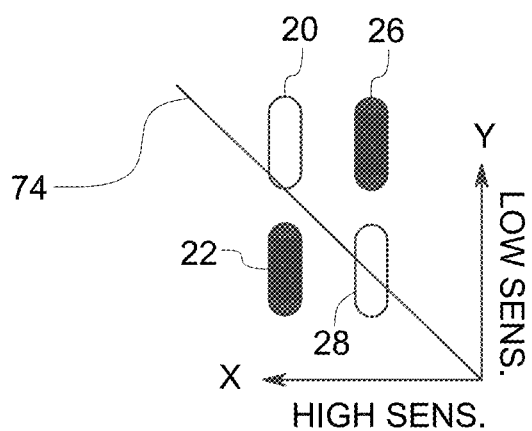
FIG. 6 illustrates a diagrammatical representation of an exemplary force imposed along a predefined direction in accordance with an embodiment of FIG. 1.

FIG. 6 illustrates a diagrammatical representation of an exemplary force imposed along a direction 74 in accordance with the embodiment of FIG. 1. A force imposed in any direction on the XY coordinate system may be resolved into an X-directed force and a Y-directed force. It should be noted herein that the sensor 38 exhibits a low sensitivity to force components along the Y-axis and a high sensitivity to force components along the X-axis.

Figure 7:
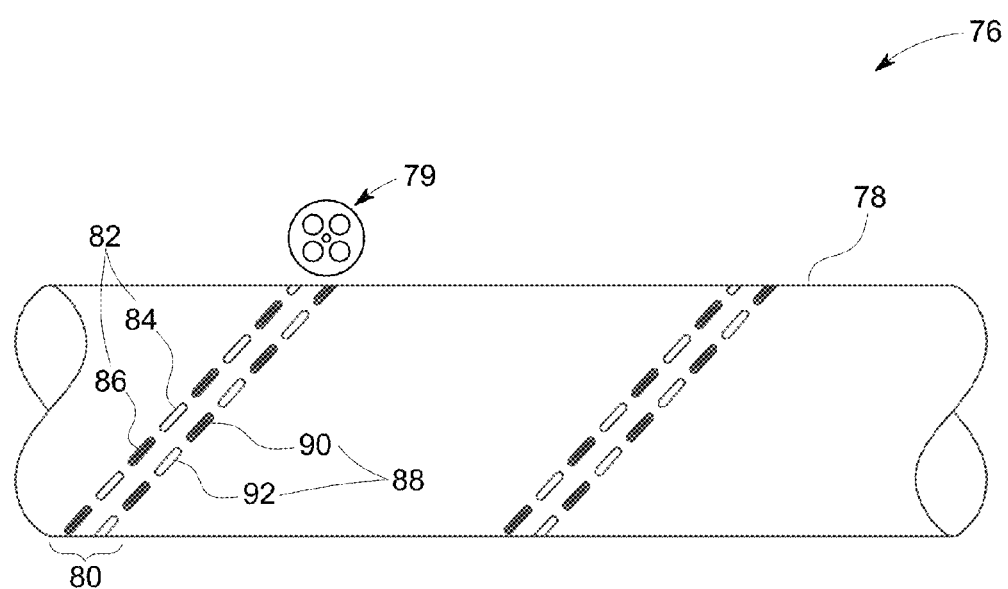
FIG. 7 is a diagrammatical representation of a system having a magnetically encoded shaft and an inductive force sensor in accordance with an exemplary embodiment.

Referring to FIG. 7, a system 76 having a magnetically encoded shaft 78 and an inductive force sensor 79 are disclosed. Specifically, a magnetically encoded region 80 disposed around a circumference of the shaft 78 is disclosed. The encoded region 80 includes a first band 82 having a first magnetically encoded region 84 and a second magnetically encoded region 86. The encoded region 80 further includes a second band 88 having a third magnetically encoded region 90 and a fourth magnetically encoded region 92. The encoded regions 84, 86 are separated from the encoded regions 90, 92 by torque-sensitive regions.

In the illustrated embodiment, the encoded region 80 is similar to the embodiment of FIG. 1, except that the encoded regions 84, 86, 90, 92 are formed in a spiral pattern relative to the axis of rotation of the shaft 78. In the illustrated embodiment, the inductive force sensor 79 is disposed proximate to the magnetically encoded region 80 of the shaft 78. The inductive force sensor 80 may be similar to the force sensor 38 of FIG. 1.

In accordance with the embodiments of the present invention, inductive sensors discussed herein generate an alternating magnetic field that induces alternative currents in the shaft having sectional magnetic encoding regions. It should be noted herein that the sectional magnetic encoding regions are not adversely affected by the generated external magnetic field or the corresponding currents flowing through the encoded regions in the shaft due to the use of the inductive force sensor. Such an exemplary sensing system generates circularly closed flux lines of magnetization of the shaft. Such sectional magnetic encoding regions are adversely affected only if there is a presence of substantially stronger external magnetic field. Weak external magnetic fields do not adversely affect sectional magnetic encoding regions of the shaft because a significant amount of energy is needed to change the orientation of a magnetic dipole in the magnetized shaft. In accordance with the embodiments discussed herein, the magnetic encoded regions of the shaft are not weakened due to use of an inductive force sensor.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a device, comprising;
      a first band comprising a first magnetically encoded region having a first magnetic polarity spaced apart from a second magnetically encoded region having a second magnetic polarity; and
      a second band comprising a third magnetically encoded region having the second magnetic polarity spaced apart from a fourth magnetically encoded region having the first magnetic polarity; wherein the first band is spaced apart from the second band such that the first magnetically encoded region is opposite the third magnetically encoded region and the second magnetically encoded region is opposite to the fourth magnetically encoded region; wherein the first magnetically encoded region is separated from the third magnetically encoded region by a first torque-sensitive region and the second magnetically encoded region is separated from the fourth magnetically encoded region by a second torque-sensitive region; and
   a contactless inductive force sensing system comprising;
      an excitation coil through which an electric current is passed to generate a magnetic field that permeates into the device; and
      a plurality of measurement coils for receiving the magnetic field transmitted back from the device and generating a mechanical force component signal.

2. The system of claim 1, wherein the first and second bands are oriented at a predefined angle relative to an axis of the device.

3. The system of claim 1, wherein the first magnetically encoded region is spaced apart from the second magnetically encoded region via a first dead zone, and the third magnetically encoded region is spaced apart from the fourth magnetically encoded region via a second dead zone.

4. The system of claim 1, wherein the first and second bands are provided at a predefined location on the device.

5. The system of claim 1, wherein the first and second torque-sensitive regions are sensitive to the one or more mechanical force components passing therethrough, the one or more mechanical force components altering a magnetic field associated therewith.

6. The system of claim 1, wherein magnetic fields associated with the first and second torque-sensitive regions are altered by force vectors through one or both of the first and second torque-sensitive regions.

7. The system of claim 1, wherein the first and second torque-sensitive regions are maximally sensitive to the one or more mechanical force components perpendicular to the first and second bands and minimally sensitive to the one or more mechanical force components parallel to the first and second bands.

8. The system of claim 1, wherein the device comprise a shaft.

9. The system of claim 8, wherein the contactless inductive force sensing system comprises a position sensor for measuring a rotational position on a circumference of the shaft and generating a position signal.

10. The system of claim 9, wherein the position sensor is configured to detect one or more magnetic markers disposed at predetermined circumferential locations of the shaft so as to determine the rotational position on the circumference of the shaft as the shaft is rotated.

11. The system of claim 9, wherein the contactless inductive force sensing system comprises a controller for receiving the mechanical force component signal and the position signal and correlate the mechanical force component signal with data indicative of material properties at the measured position and generate a modified force component signal.

12. The system of claim 1, wherein the contactless inductive force sensing system generates the mechanical force component signal based on a magnetostrictive effect of a material of the device.

13. A method, comprising:
transmitting an electric current through an excitation coil of a contactless inductive force sensing system to generate a magnetic field that permeates into a device; and
receiving the magnetic field transmitted back from the device and generating a mechanical force component signal via a plurality of measurement coils of the contactless inductive force sensing system; wherein the device comprises:
a first band comprising a first magnetically encoded region having a first magnetic polarity spaced apart from a second magnetically encoded region having a second magnetic polarity; and
a second band comprising a third magnetically encoded region having the second magnetic polarity spaced apart from a fourth magnetically encoded region having the first magnetic polarity; wherein the first band is spaced apart from the second band such that the first magnetically encoded region is opposite the third magnetically encoded region and the second magnetically encoded region is opposite to the fourth magnetically encoded region; wherein the first magnetically encoded region is separated from the third magnetically encoded region by a first torque-sensitive region and the second magnetically encoded region is separated from the fourth magnetically encoded region by a second torque-sensitive region.

14. The method of claim 13, further comprising generating the mechanical force component signal based on a magnetostrictive effect of a material of the device.

15. The method of claim 13, further comprising altering a magnetic field associated with the one or more mechanical force components passing through the first and second torque-sensitive regions as the device is rotated; wherein the device comprises a shaft.

16. The method of claim 15, wherein the one or more mechanical force components comprise one or more of shaft torque, bending moments, and stresses.

17. The method of claim 15, further comprising measuring a position on a circumference of the shaft and generating a position signal.

18. The method of claim 17, further comprising correlating the mechanical force component signal with data indicative of material properties at the measured position based on the position signal and generating a modified force component signal.

19. The method of claim 13, further comprising altering magnetic fields associated with the first and second force-torque regions by force vectors through one or both of the first and second torque-sensitive regions.

20. The method of claim 13, wherein the first and second torque-sensitive regions are maximally sensitive to the one or more mechanical force components perpendicular to the first and second bands and minimally sensitive to the one or more mechanical force components parallel to the first and second bands.

* * * * *